(12) United States Patent
Bose et al.

(10) Patent No.: US 11,599,795 B2
(45) Date of Patent: Mar. 7, 2023

(54) REDUCING THE COST OF N MODULAR REDUNDANCY FOR NEURAL NETWORKS

(71) Applicant: International Business Machines Corporation, Armonk, NY (US)

(72) Inventors: Pradip Bose, Yorktown Heights, NY (US); Alper Buyuktosunoglu, Yorktown Heights, NY (US); Schuyler Eldridge, Yorktown Heights, NY (US); Karthik V Swaminathan, Yorktown Heights, NY (US); Augusto Vega, Yorktown Heights, NY (US); Swagath Venkataramani, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 948 days.

(21) Appl. No.: 15/806,393

(22) Filed: Nov. 8, 2017

(65) Prior Publication Data
US 2019/0138903 A1   May 9, 2019

(51) Int. Cl.
G06N 3/08 (2006.01)
G06N 3/063 (2006.01)
G06N 3/082 (2023.01)

(52) U.S. Cl.
CPC .............. *G06N 3/082* (2013.01); *G06N 3/063* (2013.01)

(58) Field of Classification Search
CPC ........... G06N 3/08; G06N 3/063; G06N 3/082
See application file for complete search history.

(56) References Cited

U.S. PATENT DOCUMENTS

| 2009/0313195 A1* | 12/2009 | Mcdaid ............... G06N 3/0635 706/26 |
| 2012/0047351 A1* | 2/2012 | Morrison ........... G06F 11/1405 712/208 |
| 2014/0032172 A1 | 1/2014 | McCarthy et al. |
| 2014/0207711 A1* | 7/2014 | Haws ..................... G06F 17/18 706/12 |
| 2016/0328643 A1 | 11/2016 | Liu et al. |
| 2017/0091614 A1* | 3/2017 | Amir ..................... G06N 3/063 |

(Continued)

FOREIGN PATENT DOCUMENTS

EP   3091486 A2   11/2016

OTHER PUBLICATIONS

Miller, Timothy, Nagarjuna Surapaneni, and Radu Teodorescu. "Flexible error protection for energy efficient reliable architectures." 2010 22nd International Symposium on Computer Architecture and High Performance Computing. IEEE, 2010: 1-8 (Year: 2010).*

(Continued)

*Primary Examiner* — Kamran Afshar
*Assistant Examiner* — Randall K. Baldwin
(74) *Attorney, Agent, or Firm* — Peter Edwards, Esq.; McGinn I.P. Law Group, PLLC.

(57) ABSTRACT

An N modular redundancy method, system, and computer program product include a computer-implemented N modular redundancy method for neural networks, the method including selectively replicating the neural network by employing one of checker neural networks and selective N modular redundancy (N-MR) applied only to critical computations.

14 Claims, 9 Drawing Sheets

(56) References Cited

U.S. PATENT DOCUMENTS

| | | | | |
|---|---|---|---|---|
| 2018/0189631 | A1* | 7/2018 | Sumbul | G06N 3/063 |
| 2019/0130245 | A1* | 5/2019 | Sakaguchi | G06N 3/02 |
| 2019/0258251 | A1* | 8/2019 | Ditty | G05D 1/0274 |

OTHER PUBLICATIONS

Jin, Zhanpeng. Autonomously Reconfigurable Artificial Neural Network on a Chip. Diss. University of Pittsburgh, 2010: i-230 (Year: 2010).*

Li, Guanpeng, et al. "Understanding error propagation in deep learning neural network (DNN) accelerators and applications." Proceedings of the International Conference for High Performance Computing, Networking, Storage and Analysis. Nov. 2017 (Year: 2017).*

Schuyler, Eldridge and Joshi, Ajay "Exploiting hidden layer modular redundancy for fault-tolerance in neural network accelerators." (2015): 1-12. (Year: 2015).*

Li, Huai-Ting, et al. "Variation-aware reliable many-core system design by exploiting inherent core redundancy." IEEE Transactions on Very Large Scale Integration (VLSI) Systems 25.10 (Oct. 2017): 2803-2816. (Year: 2017).*

Akopyan, Filipp, et al. "Truenorth: Design and tool flow of a 65 mw 1 million neuron programmable neurosynaptic chip." IEEE transactions on computer-aided design of integrated circuits and systems 34.10 (2015): 1537-1557. (Year: 2015).*

Eldridge, Schuyler, et al. "Towards general-purpose neural network computing." 2015 International Conference on Parallel Architecture and Compilation (PACT). IEEE, 2015: 99-112. (Year: 2015).*

De Castro, Leandro Nunes, Fernando J. Von Zuben, and Getúlio A. de Deus Jr. "The construction of a Boolean competitive neural network using ideas from immunology." Neurocomputing 50 (2003): 51-85. (Year: 2003).*

Curteanu, Silvia, and Hugh Cartwright. "Neural networks applied in chemistry. I. Determination of the optimal topology of multilayer perceptron neural networks." Journal of Chemometrics 25.10 (2011): 527-549. (Year: 2011).*

Engelmann, Christian, Hong H. Ong, and Stephen L. Scott. "The case for modular redundancy in large-scale high performance computing systems." Proceedings of the 8th IASTED international conference on parallel and distributed computing and networks (PDCN). 2009. (Year: 2009).*

Schirmeier, Horst Benjamin. Efficient fault-injection-based assessment of software-implemented hardware fault tolerance. Diss. 2016: i-263 (Year: 2016).*

Ekong, Donald Uwemedimo. A fault tolerance technique for feedforward neural networks. University of Saskatchewan, 1998: i-170. (Year: 1998).*

Krcma, Martin, Zdenek Kotasek, and Jakub Lojda. "Triple modular redundancy used in field programmable neural networks." 2017 IEEE East-West Design & Test Symposium (EWDTS). IEEE, Sep. 2017. (Year: 2017).*

Mel et al. "The NIST Definition of Cloud Computing". Recommendations of the National Institute of Standards and Technology. Nov. 16, 2015.

* cited by examiner

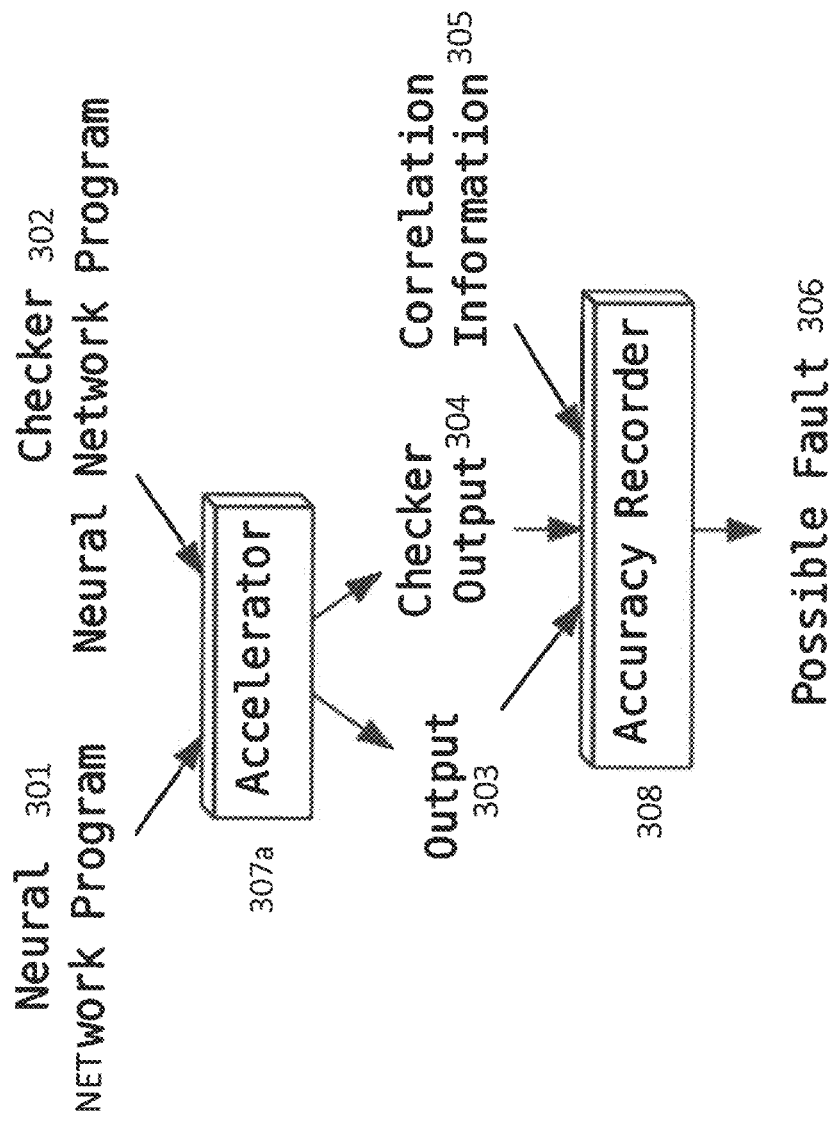

US 11,599,795 B2

REDUCING THE COST OF N MODULAR REDUNDANCY FOR NEURAL NETWORKS

This invention was made with Government support under Contract No.: HR0011-13-C-0022 awarded by the Defense Advanced Research Projects Agency (DARPA). The Government has certain rights in this invention.

BACKGROUND

The present invention relates generally to an N modular redundancy method (where N is an integer greater than 0), and more particularly, but not by way of limitation, to a system, method, and computer program product for the use of small neural network checkers and selective N modular redundancy (N-MR) applied only to critical computations.

Conventionally, N Modular Redundancy (N-MR) is a fault detection/correction technique that can be applied to generic systems, but also to neural networks (eg., both convolutional and recurrent). N-MR provides a way to improve the resilience of computed systems to run-time faults. N-MR is applied at a level of a complete neural network and not at the level of individual computation.

However, while N-MR can replicate graph(s) (e.g., directed acyclic graphs) to check accuracy, N-MR is often prohibitively expensive as it requires replicating computation by a factor of N either temporally (e.g., through serially repeating computation N times) or spatially (through N redundant hardware units operating in parallel).

Thus, there is a need in the art for a structure of neural networks that allows for N-MR techniques with lower cost.

SUMMARY

In an exemplary embodiment, the present invention can provide a computer-implemented N modular redundancy method for neural networks, the method including selectively replicating the neural network by employing one of checker neural networks and selective N modular redundancy (N-MR) applied only to critical computations. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 3 exemplarily shows a second embodiment of checker neural networks;

DETAILED DESCRIPTION

Figure 1:
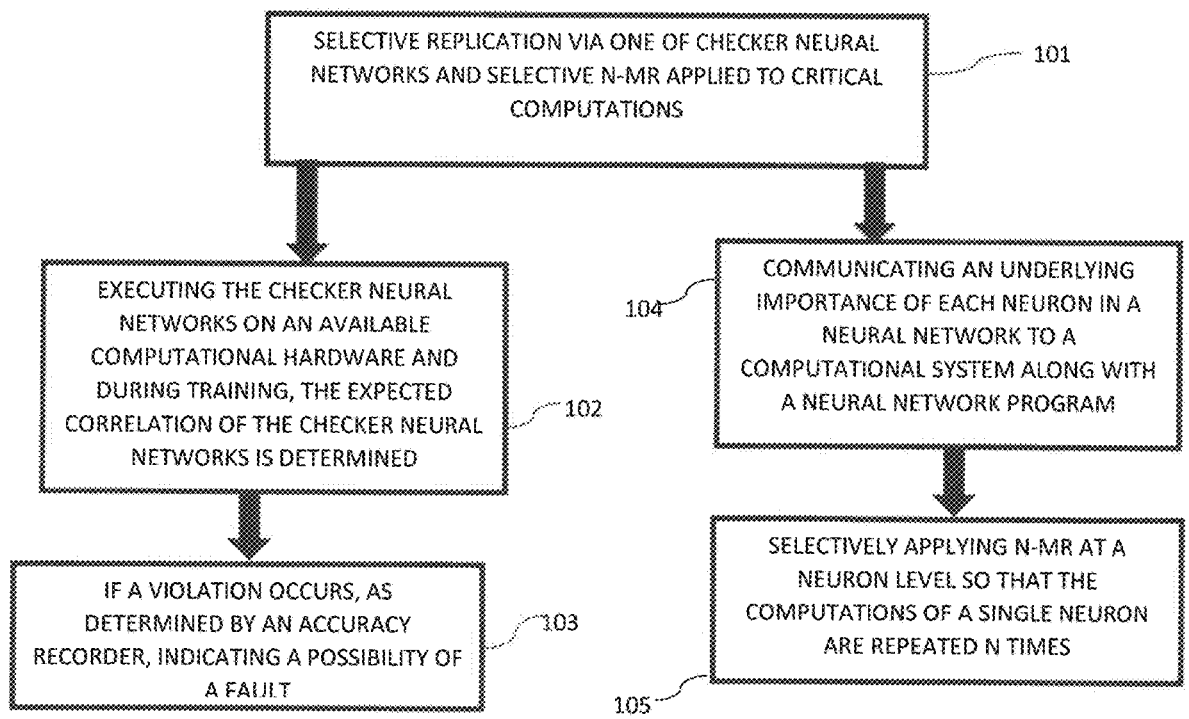
FIG. 1 exemplarily shows a high-level flow chart for an N modular redundancy method 100 according to an embodiment of the present invention.

The invention will now be described with reference to FIGS. 1-7, in which like reference numerals refer to like parts throughout. It is emphasized that, according to common practice, the various features of the drawings are not necessarily to scale. On the contrary, the dimensions of the various features can be arbitrarily expanded or reduced for clarity, By way of introduction of the example depicted in FIG. 1, an embodiment of an N modular redundancy method 100 according to the present invention can include various steps for reducing the cost of N modular redundancy(N-MR) for neural networks through selective replication.

Figure 5:
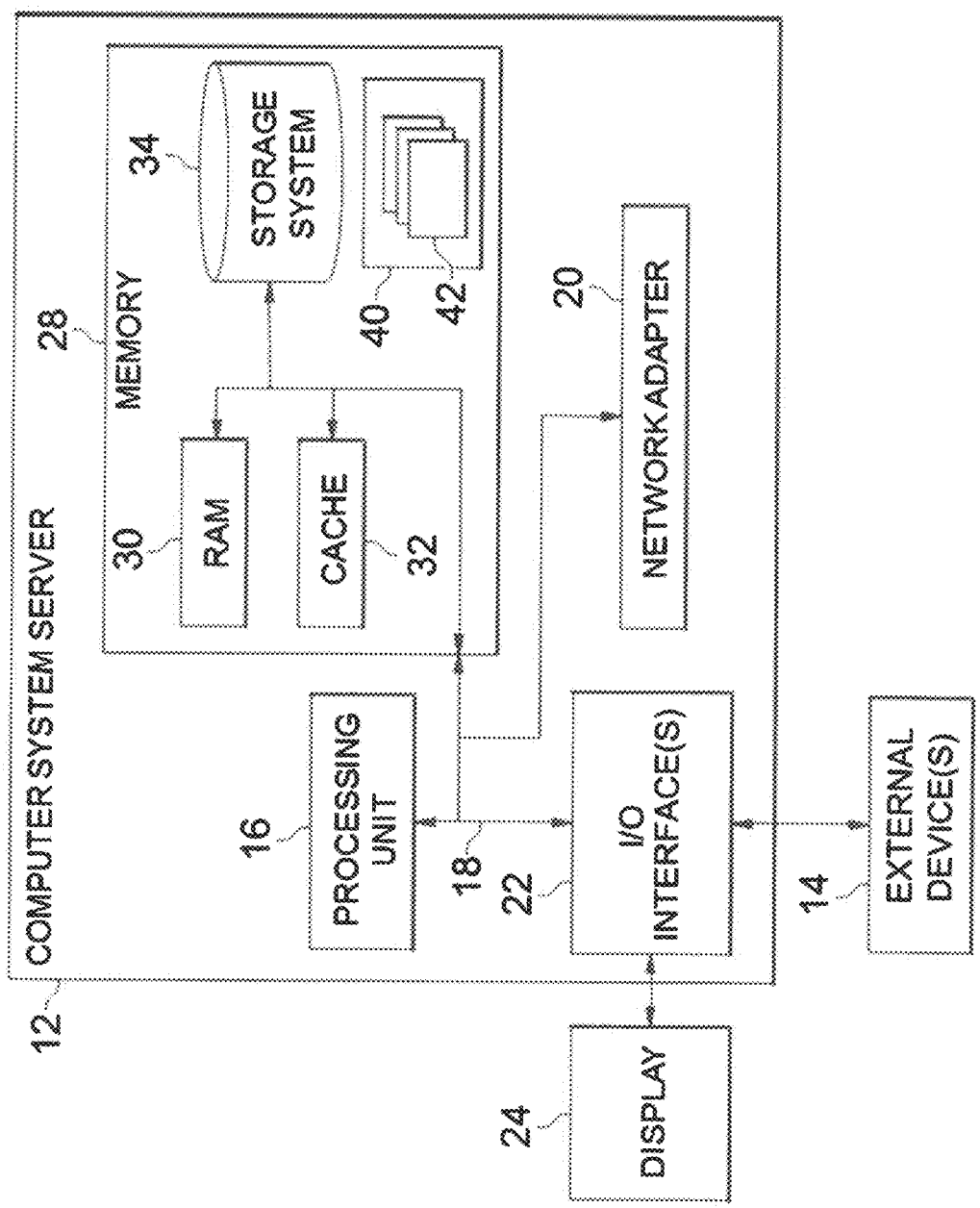
FIG. 5 depicts a cloud-computing node 10 according to an embodiment of the present invention.

By way of introduction of the example depicted in FIG. 5, one or more computers of a computer system 12 according to an embodiment of the present invention can include a memory 28 having instructions stored in a storage system to perform the steps of FIG. 1.

With reference now to FIG. 1, in step 101, for reducing the cost of N modular redundancy for neural networks through selective replication, the method can employ one of (or both of) the use of small neural network checkers ("checker neural networks") and selective N-MR applied only to critical computations.

Figure 2:
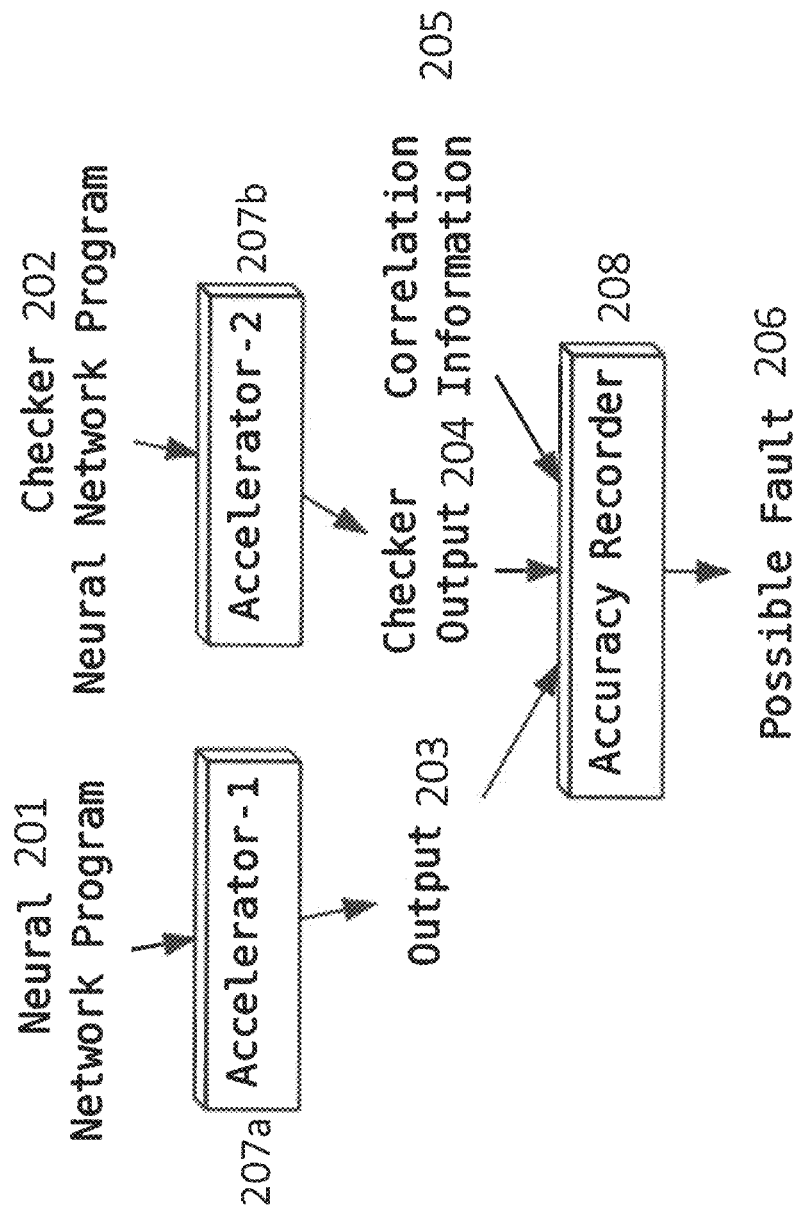
FIG. 2 exemplarily shows a first embodiment of checker neural networks.

As depicted in FIGS. 2-3, in a first embodiment, a check neural network(s) can be employed to reduce the cost of N modular redundancy. Referring back to FIG. 1, in steps 102-103, a neural network program mid one or more checker neural networks execute on available computational hardware (e.g., a central processing unit (CPU), graphics processing unit (CPU), or dedicated neural network accelerator as exemplarily depicted in FIGS. 2-3). During training, the expected correlation of the checker neural networks is determined. If a violation occurs, as determined by an Accuracy Recorder, then the overall system indicates the possibility of a fault. Such correlations may take the form of correlations for all expected input-output pairs or correlations across multiple input-output relationships. The checker may be run everywhere.

For example, the correlations can include correlations for all expected input-output pairs (e.g., steady-state). That is, the small neural network provides an output with reduced precision, (e.g., for a regression problem of approximating a function). That is, the checker neural network provides one significant digit of accuracy while the large neural network may provide ten. If the networks disagree, then a fault has occurred.

As another example, the correlations can include correlations across multiple input-output relationships. The checker neural network provides an output in agreement with the original network some percentage of the time (e.g., on a classification task the networks disagree only 5% of the time). A difference in the historical agreement of the networks indicates a fault in the accelerator hardware. Thus, if there is some prior information known about the data, the checker can affirm it.

Deviations indicate the possibility of a fault and the system may either report this or take some corrective action (e.g., repeat the computation).

For minimal cost, the checker network may be significantly smaller(i.e., an order of magnitude smaller) in terms of computational time or hardware area.

For example, as depicted in FIG. 2, a neural network program 201 is run on an accelerator-1 207a which produces an output 203. The N-MR runs the check neural network program 202 on a second accelerator-2 207b which produces a checker output 204. The predetermined correlation information 205 relates the checker output 204 with the output 203 via the accuracy recorder 208 for a possible fault(s) 206. That is, the checker output can be the same or similar to the output of the accelerator or can be something related to the output 203, the possible fault 206 is identified by the invention and corrective action may be taken.

Alternatively, as shown in FIG. 3, a single accelerator can be used for both of the checker neural network program 302 and the neural network program 301. The single accelerator 307a produces an output 303, checker output 304 and the accuracy recorder 308 uses the correlation information 305 to determine a possible fault(s) 306. That is, the underlying hardware accelerator may be virtualized. In such a system as exemplarily depicted in FIG. 3, one accelerator (or computational system, e.g., CPU, GPU) is time-multiplexed or capable of processing multiple simultaneous requests, e.g., a neural network program and a checker program. In this embodiment, one accelerator produces both the output and checker output.

Figure 4A:
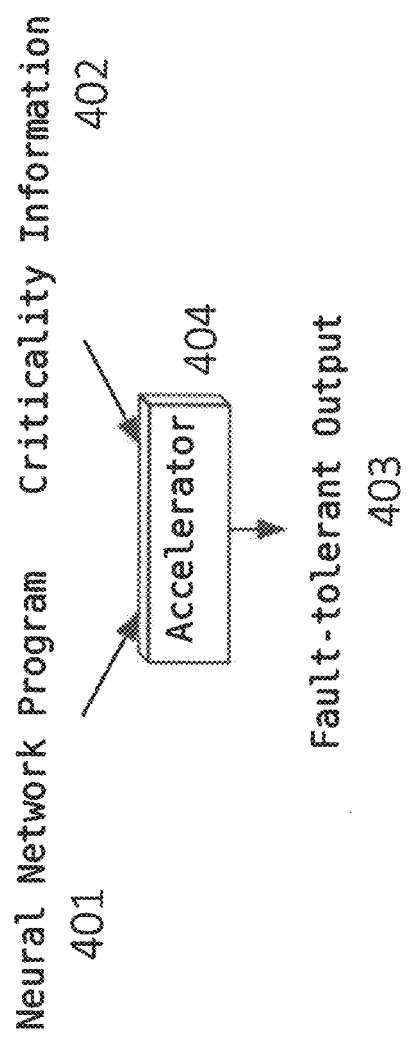
FIGS. 4A-4C exemplarily show an embodiment of N-MR selectively applied only to critical computations.
Figure 4B:
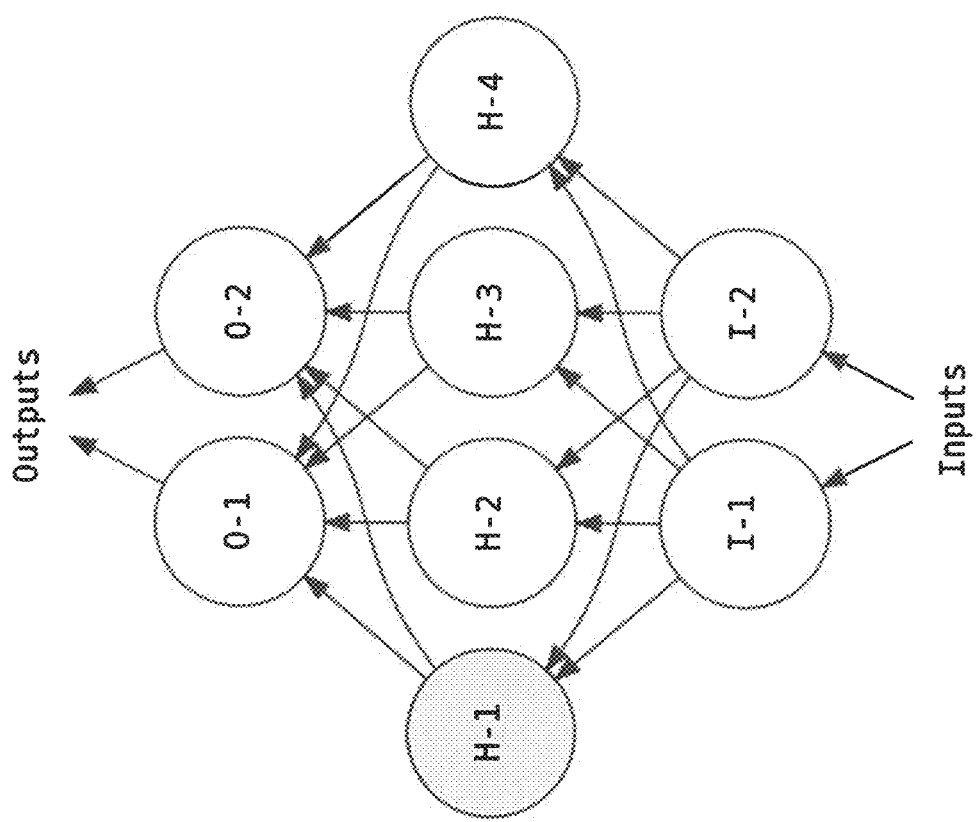
Figure 4C:
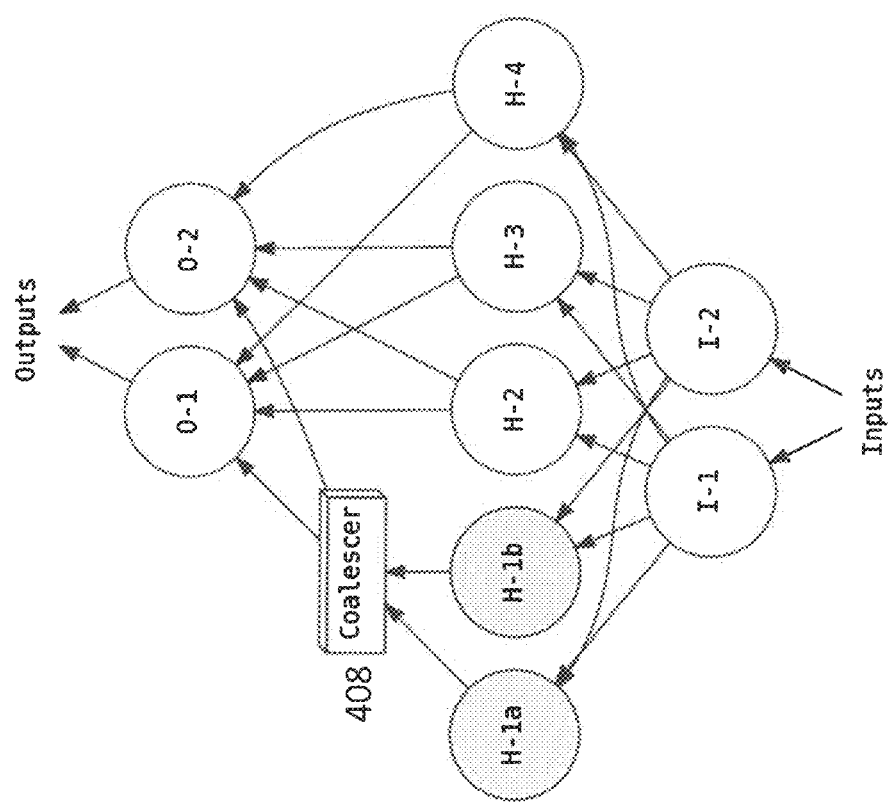

In steps 104-105, the underlying importance of each neuron in a neural network is communicated to a computational system along with a neural network program. The computational system uses this information to selectively apply N-MR at the neuron level, so that the computations of a single neuron are repeated N times. Criticality information is determined statically by an analysis of the neural network to determine which neurons contribute maximally to the overall network output. For example, as depicted in FIGS. 4A-4C, the neural network program 401 runs on the accelerator 404 and the criticality information 402 is also run on the accelerator. Thus, an accelerator that consumes criticality information to execute a neural network program in a fault tolerant manner (i.e., fault tolerant output 403) using selective application of N-MR at the neuron level. However, as shown in FIGS. 4B-4C, a single neuron is selected (e.g., hidden layer (H-1) is identified as critical by a static analysis) as critical and these computations are run as the check (e.g., the accelerator uses this information to selectively apply N-MR at the neuron level (i.e., the computations of a single neuron are repeated N times)). Such criticality may be determined when training the neural network. Moreover, such criticality can be overall or partial. Selective N-MR can be applied (qualitatively or quantitatively) to the most critical computations or to all of the computations deemed to be critical. Thus, the critical N-MR splits the H-1 neuron into a first neuron H-1a and a second neuron H-1b which are run and checked via a coalescer 408 for a fault-tolerant output. In other words, the critical neuron (H-1) is split into two neurons (i.e., dual modular redundancy or N-MR with N==2). Such splitting into two nodes produces a more fault-tolerant system. The output of these neurons must be combined in some way via a coalescer 408.

The Coalescer may be an averaging unit (alternatively accomplished by dividing outgoing weights from replicated neurons by N), a majority vote, and/or an equality checker that repeats the computations of these neurons until equality is reached, etc.

Criticality information can be determined statically by an analysis of the neural network to determine which neurons contribute maximally to the overall network output.

Therefore, the invention is orthogonal in that it acts to reduce the cost of additional modular redundancy added to a network after the fact as opposed to reducing the cost of computing the outputs of the original neural network.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server e and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS); the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 5, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below. Memory 28 may include a computer program product storing one or program modules 42 comprising computer readable instructions configured to carry out One or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 6:
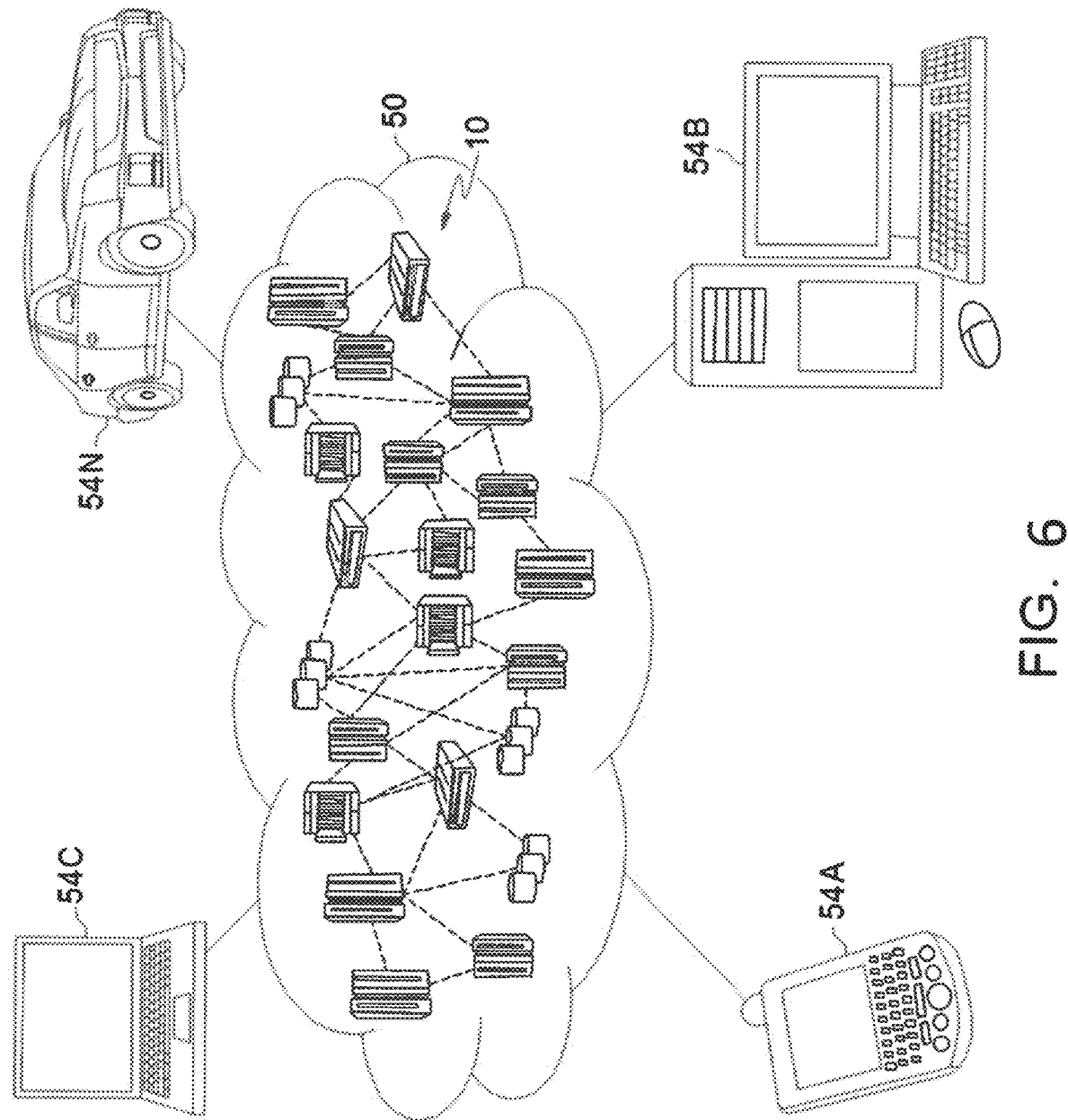
FIG. 6 depicts a cloud-computing environment 50 according to an embodiment of the present invention.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Figure 7:
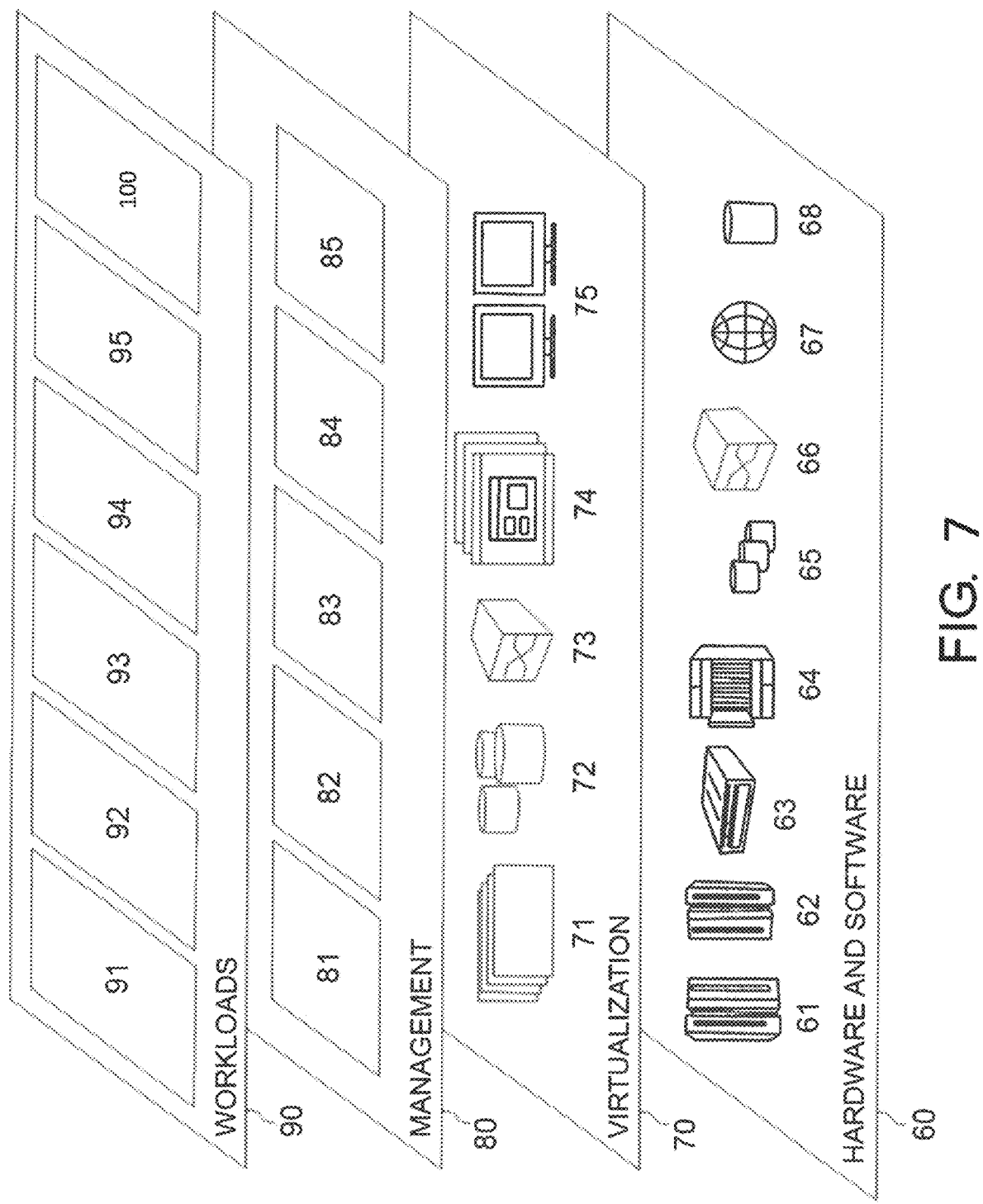
FIG. 7 depicts abstraction model layers according to an embodiment of the present invention.

Referring now to FIG. 7, an exemplary set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and N modular redundancy method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USE "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic-waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented N modular redundancy (N-MR) method for neural networks, the method comprising:
   determining, during a training phase of a neural network, a criticality for respective computations performed in each neuron within the neural network;
   selectively applying N-MR to the respective computations in each neuron having the criticality that is higher than a predetermined threshold,
   wherein the training phase of the neural network determines which of the respective computations contribute maximally to an overall network output; and
   selectively replicating the neural network by employing one of a checker neural network and selective N-MR, when the checker neural network is employed, executing a neural network program and at least one checker neural network on an available computational hardware component,
   wherein the checker neural network is virtualized such that an accelerator connected to the checker neural network is time-multiplexed, and
   when the checker neural network is employed,
      during training, determining a correlation of the checker neural network; and
      indicating a possible fault if a violation occurs, as determined by an accuracy recorder.

2. The method of claim 1, wherein the correlation includes correlations for all expected input-output pairs.

3. The method of claim 1, wherein the correlation includes correlations across multiple input-output relationships to provide an output in agreement with an original network at some percentage of a time, where a difference in a historical agreement of the neural networks indicates the fault.

4. The method of claim 1, wherein the checker neural network is at least an order of magnitude smaller in a size than the neural network being checked.

5. The method of claim 1, wherein the neural network is executed on a first computational hardware component and the checker neural network is executed on a second computational hardware component.

6. The method of claim 1, wherein the neural network and the checker neural network are executed on a single computational hardware component.

7. The method of claim 6, wherein the single computational hardware component is capable of processing multiple simultaneous requests.

8. The method of claim 1, wherein the available computational hardware component comprises one accelerator producing both an output of the neural network and an output of the checker neural network.

9. The method of claim 1, wherein the neuron that has N-MR applied thereto is split into two neurons and an output of the two neurons is to be combined via a coalescer to check for a fault.

10. The method of claim 9, wherein the coalescer includes at least one of:
an averaging unit;
a median unit;
a majority vote; and
an equality checker that repeats a computation of the two neurons until equality is reached.

11. The computer-implemented method of claim 1, embodied in a cloud-computing environment.

12. An N modular redundancy (N-MR) system for neural networks, said system comprising:
a processor; and
a memory, the memory storing instructions to cause the processor to perform:
determining, during a training phase of a neural network, a criticality for respective computations performed in each neuron within the neural network;
selectively applying N-MR to the respective computations in each neuron having the criticality that is higher than a predetermined threshold,
wherein the training phase of the neural network determines which of the respective computations contribute maximally to an overall network output; and
selectively replicating the neural network by employing one of a checker neural network and selective N-MR, when the checker neural network is employed, executing a neural network program and at least one checker neural network on an available computational hardware component,
wherein the checker neural network is virtualized such that an accelerator connected to the checker neural network is time-multiplexed, and when the checker neural network is employed,
during training, determining a correlation of the checker neural network; and
indicating a possible fault if a violation occurs, as determined by an accuracy recorder.

13. The system of claim 12, embodied in a cloud-computing environment.

14. A computer program product for N modular redundancy (N-MR) for neural networks, the computer program product comprising a computer-readable storage medium having program instructions embodied therewith, the program instructions executable by a computer to cause the computer to perform:
determining, during a training phase of a neural network, a criticality for respective computations performed in each neuron within the neural network;
selectively applying N-MR to the respective computations in each neuron having the criticality that is higher than a predetermined threshold,
wherein the training phase of the neural network determines which of the respective computations contribute maximally to an overall network output; and
selectively replicating the neural network by employing one of a checker neural network and selective N-MR, when the checker neural network is employed, executing a neural network program and at least one checker neural network on an available computational hardware component,
wherein the checker neural network is virtualized such that an accelerator connected to the checker neural network is time-multiplexed, and
when the checker neural network is employed,
during training, determining a correlation of the checker neural network; and
indicating a possible fault if a violation occurs, as determined by an accuracy recorder.

* * * * *